July 4, 1972  A. J. ANTHONY ET AL  3,674,635
BIMETALLIC SPACER GRID
Filed March 27, 1970  3 Sheets-Sheet 2

INVENTORS
ANDREW J. ANTHONY
ALBERT L. GAINES
DONALD M. KRAWIEC

July 4, 1972   A. J. ANTHONY ET AL   3,674,635
BIMETALLIC SPACER GRID
Filed March 27, 1970   3 Sheets-Sheet 3

INVENTORS
ANDREW J. ANTHONY
ALBERT L. GAINES
DONALD M. KRAWIEC

United States Patent Office 3,674,635
Patented July 4, 1972

3,674,635
BIMETALLIC SPACER GRID
Andrew J. Anthony, Tariffville, Albert L. Gaines, West Simsbury, and Donald M. Krawiec, Thompsonville, Conn., assignors to Combustion Engineering, Inc., Windsor, Conn.
Filed Mar. 27, 1970, Ser. No. 23,231
Int. Cl. G21c 3/34
U.S. Cl. 176—78                                    5 Claims

ABSTRACT OF THE DISCLOSURE

An improved bimetallic spacer grid arrangement for fuel element support in nuclear reactors. A plurality of primary spacer elements are nested with a plurality of secondary spacer elements, the primary spacer elements extending less than one-half the full depth of the secondary spacer elements. Spring ferrules are positioned relative to the primary spacer elements at particular locations within the spacer grid arrangement for retention therebetween. The primary and secondary spacer elements are formed from a first material having characteristic low neutron capture cross section while the spring ferrules are formed from a second material having better stress relaxation properties than the first material.

BACKGROUND OF THE INVENTION

Proper and efficient supporting of fuel elements within nuclear reactors has been a subject upon which there has been much study and experimentation. The problem is complicated by the varied considerations which must be taken into account when designing the fuel element support structure. The supporting structure arrangement must permit relatively efficient distribution of flow of the reactor coolant over the fuel elements in order to prevent overheating and possible rupture of the fuel element claddings. Moreover, the material from which the supporting structure is fabricated must be of a characteristic low neutron capture cross section in order not to adversely affect over-all reactor efficiency; at the same time the material must be of such a strength so as to provide sufficient support of the fuel elements to prevent damaging vibrations from developing therein. Additionally, the spacer grid arrangement must be capable of permitting easy loading of the fuel elements without the possibility of their jamming or binding.

A grid spacer arrangement incorporating all of the desired design features discussed above is found in copending U.S. application Ser. No. 748,149 of Donald M. Krawiec entitled "Spacer Grid." In the novel spacer grid arrangement of that application, a plurality of spacer elements formed from a first material having a characteristic low neutron capture cross section are mated with spring ferrules formed of a second material having better stress relaxation properties than the first mentioned material (but a relatively less favorable neutron capture cross section) so as not to suffer substantial decrease in ability to apply load due to prolonged exposure to intensive radiation. The particular mating arrangement cooperates to support each fuel element at five points of contact so as to provide proper and efficient support for the elements without substantially interfering with reactor coolant flow.

SUMMARY OF THE INVENTION

In order to reduce the amount of material and thus the cost of the spacer grid arrangement of U.S. application Ser. No. 748,149, it has been found that the spacer elements supporting the spring ferrules (primary spacer elements) may be constructed of less than one-half the full depth of the spacer elements against which the fuel elements are biased (secondary spacer elements). Since the spring ferrules are still entrapped between transversely oriented primary spacer elements nested within the secondary spacer elements, the five-point contact for fuel element support and the relatively efficient distribution of reactor coolant flow is maintained with a substantial material savings due to the reduced dimensions of the primary spacer elements.

DESCRIPTION OF THE PREFERRED EMBODIMENT

Figure 1:
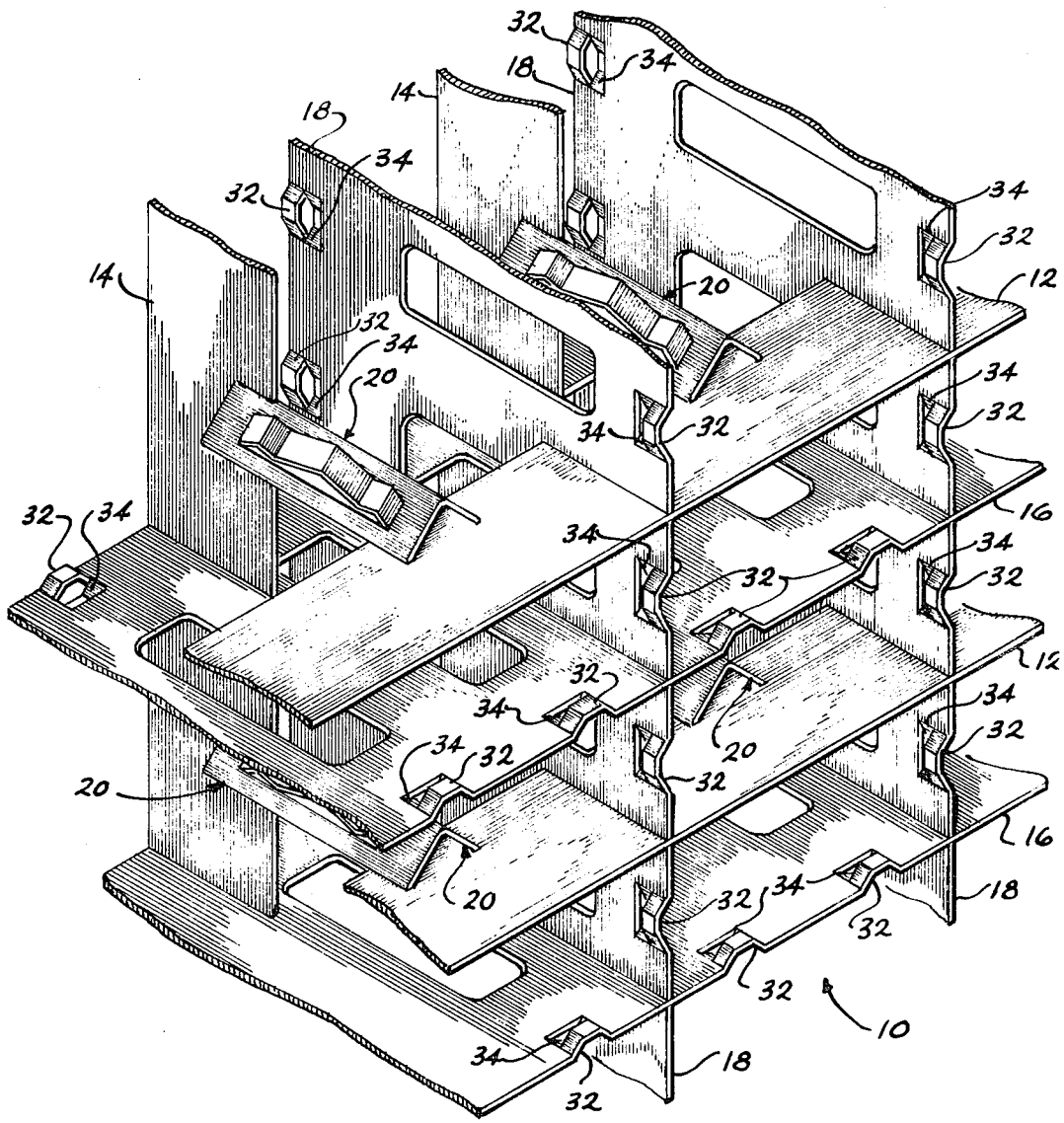
FIG. 1 is a perspective view of an exemplary portion of the spacer grid arrangement according to the present invention rotated 90° from the vertical axis for ease of showing.
Figure 6:
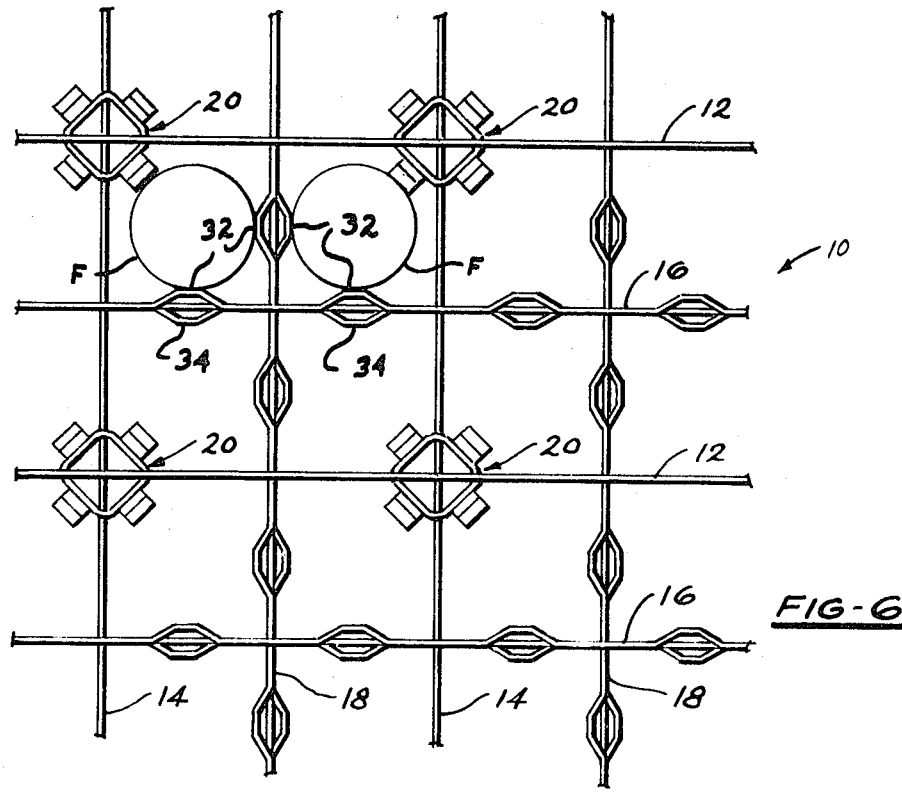
FIG. 6 is a plan view of the exemplary section of the spacer grid arrangement of FIG. 1.
Figure 7:
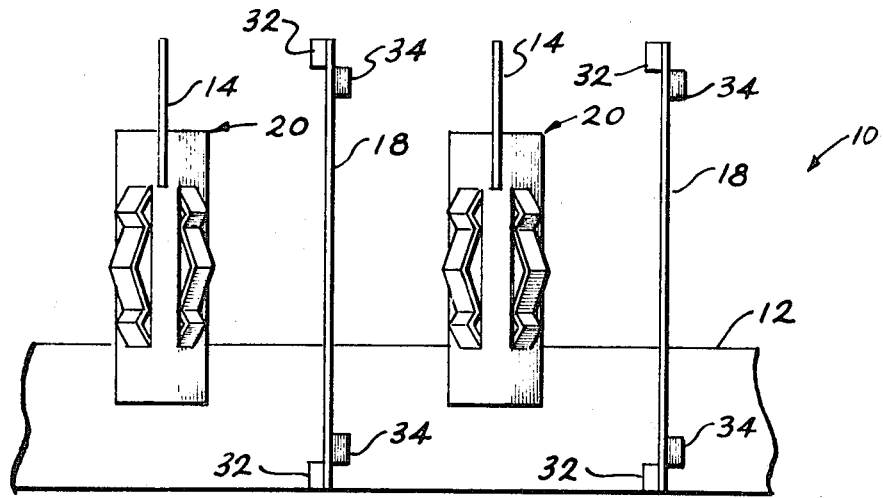
FIG. 7 is a sectional side elevation of the exemplary section of the spacer grid arrangement of FIG. 1.

Referring now to the drawings, FIGS. 1, 6 and 7 show an exemplary section of the improved bimetallic spacer grid arrangement 10 of this invention. The arrangement 10 is comprised of an internested series of spacer elements including a first series of primary spacer elements 12 aligned in spaced parallel rows and a second series of primary spacer elements 14 aligned in spaced parallel rows oriented transversely to the rows of spacer elements 12 and spaced longitudinally therefrom. Parallel to the primary spacer elements 12 and positioned therebetween are a first series of parallel rows of secondary spacer elements 16. Similarly, a second series of secondary spacer elements 18 are oriented transversely to the first series of secondary spacer elements 16, the secondary spacer elements 18 being interspaced between the second series of primary spacer elements 14 parallel thereto. A unitary structure is assured by welding the points of intersection of the spacer elements. A plurality of spring ferrules 20 are positioned within the grid arrangement 10 so as to be retained between transversely oriented spacer elements 12 and 14.

Figure 2:
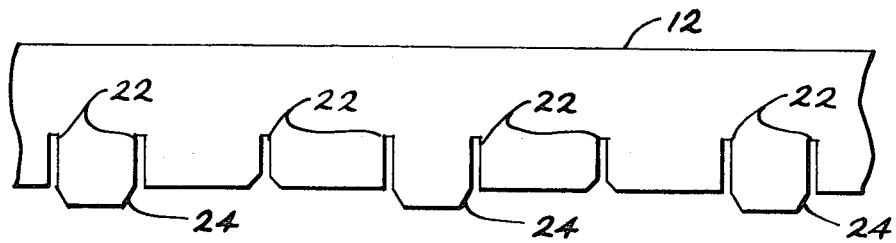
FIG. 2 is a side elevational view of a portion of a primary spacer element of FIG. 1.

An exemplary primary spacer element 12 is shown in FIG. 2 (primary spacer element 14 being of identical construction). The spacer element 12 is formed of a strip of a first material having a low neutron capture cross section so as not to adversely affect over-all reactor efficiency. A typical material meeting this description is zirconium. A series of slots 22 are cut into the strip of the primary spacer element 12 in order to facilitate the mating and internesting thereof with the spring ferrules 20 and with the secondary spacer elements 18 (and 16). The primary spacer element 12 has tab-like projections 24 which are inserted within the body of the spring ferrule 10 to insure added support thereof by the primary spacer elements.

The depth of the primary spacer element 12 is less than one-half the full depth of the secondary spacer elements 16 and 18 and ideally is approximately one-third the full depth thereof. This provides a material savings of about 30 percent with a similar savings in cost. These savings are accomplished without any reduction in the efficiency of the grid arrangement 10 to support the fuel elements.

Figure 3:
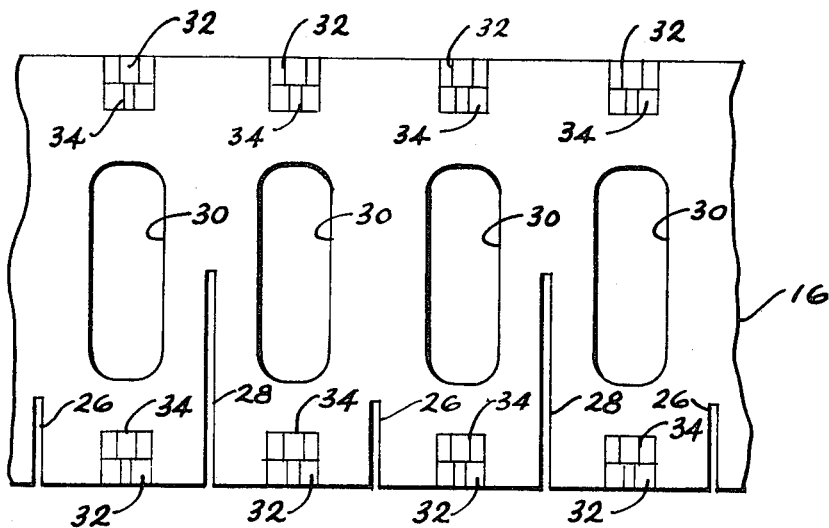
FIG. 3 is a side elevational view of a portion of the secondary spacer element of FIG. 1.

An exemplary secondary spacer element 16 is shown in FIG. 3 (the secondary spacer elements 18 being identical in construction). Secondary spacer elements 16 are formed from the same material as are the primary spacer elements 12 and 14 so as to have the same characteristic low neutron capture cross section. Slots 26 and 28 are cut in series into the secondary spacer element 16 so as to facilitate the mating and internesting with primary spacer elements and transversely oriented secondary spacer elements, respectively. Cut-out openings 30 are provided in the body of the secondary spacer element 16 in order to reduce the amount of material therein as well as to facilitate the flow of reactor coolant through the grid arrangement 10. The secondary spacer element 16 has a series of arches 32 and 34 which serve as points of support against which the fuel elements F, passing through the spacer grid arrangement 10, are biased by the spring ferrules 20.

Figure 4:
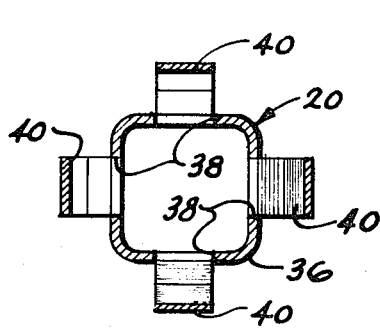
FIG. 4 is a sectional view of the spring ferrule taken on the line 4—4 of FIG. 5.
Figure 5:
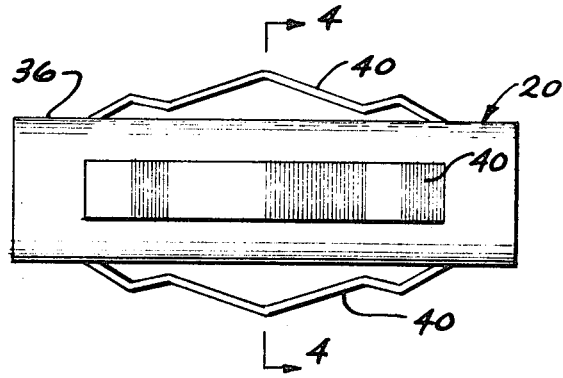
FIG. 5 is a side elevational view of a spring ferrule of FIG. 4.

An exemplary spring ferrule 20 which serves to bias fuel elements against the arches 32 and 34 of the secondary spacer elements 16 and 18 is shown in FIGS. 4 and 5. The spring ferrule 20 has an elongated substantially rectangular body 36 having openings 38 in the sides thereof. Spring members 40 project from the openings 38 and serve as the fuel element biasing members. The spring ferrules 20 are formed from a second material which has better stress relaxation properties than the material from which the spacer elements are formed. Such a material as the nickel, chromium, iron alloy having the trade name Inconel has been found to have the necessary stress relaxation properties. This material permits prolonged biasing of the fuel elements F without a lessening in the ability to apply the biasing load thereto due to radiation exposure.

The primary and secondary spacer elements are internested in the following manner. The first and second series of transversely oriented secondary spacer elements (16, 18) are internested to form an initial grid work. The first series of primary spacer elements 12 is mated with the second series of secondary spacer elements 18 in one portion of the depth of the grid arrangement. The second series of primary spacer elements 14 is mated with the first series of secondary spacer elements 16 in the opposite portion of the depth of grid arrangement so as to be longitudinally spaced from the transversely oriented first series of primary spacer elements 12. The spring ferrules 20 are then nested in the spacer grid arrangement 10 so as to be located between the longitudinally spaced transversely oriented rows of primary spacer elements 12 and 14. That is to say, one end of each spring ferrule 20 is inserted in the slots 22 of the first series of primary spacers 12 so that tabs 24 will support that end of the ferrule. The opposite end of each ferrule 20 is supported in a like manner by the transversely oriented second series of primary spacers 14 to positively entrap the ferrules within the grid arrangement 10. The spacer elements 12, 14, 16 and 18 are welded together to insure a unitary structure. The spring ferrules 20, however, cannot be welded into the grid arrangement because of the incompatibility of the two materials from which the elements are formed.

Thus it can be seen that a spacer grid arrangement is provided which has the advantages of the aforementioned bimetallic spacer grid of the U.S. application Ser. No. 748,149 (i.e., multi-point support of fuel elements passing through the grid arrangement and relatively efficient distribution of reactor coolant flow). The instant arrangement of primary spacer elements of less than one-half depth provides a substantial reduction in the amount of material necessary to accomplish the spacer grid arrangement with a resultant cost savings without effecting the over-all efficiency thereof.

While this preferred embodiment of the invention has been shown and described, it will be understood that it is merely illustrative and that changes may be made without departing from the scope of the invention as claimed.

We claim:

1. An improved bimetallic fuel assembly spacer grid for fuel element support within a nuclear reactor comprising: a first series of primary spacer elements aligned in spaced parallel rows, a second series of primary spacer elements aligned in spaced parallel rows transversely oriented to and longitudinally spaced from said first series of primary spacer elements; a first series of secondary spacer elements aligned in spaced parallel rows and interspaced between said first series of primary spacer elements to be parallel therewith and internested with said second series of primary spacer elements, a second series of secondary spacer elements aligned in spaced parallel rows and interspaced between said second series of primary spacer elements to be parallel therewith and internested with said first series of primary spacer elements and said first series of secondary elements; said primary and secondary spacer elements being formed of a first material having a characteristic low neutron capture cross section, said primary spacer elements extending less than one-half the full depth of said secondary spacer elements in the internested arrangement; and a plurality of spring ferrules being formed of a second material which has better stress relaxation properties than said first material, each individual spring ferrule of said plurality of spring ferrules is located so as to intersect and be contained between one of said spacer elements of said first series of primary spacer elements and a longitudinally spaced transversely oriented spacer of said second series of said primary spacer elements.

2. The apparatus of claim 1 wherein said primary spacer elements extend one-third the full depth of said secondary spacer elements.

3. The apparatus of claim 2 wherein said spring ferrules comprise substantially rectangular hollow body portions having openings in the sides thereof from which are projected spring members, and wherein said secondary spacer elements have arches formed integrally therewith so as to be opposite said spring members to support the fuel elements therebetween.

4. The apparatus of claim 3 wherein said first material is zirconium and said second material is a nickel, chromium, iron alloy.

5. An improved bimetallic fuel assembly spacer grid for fuel element support within a nuclear reactor comprising: a plurality of zirconium primary spacer elements having transverse slots therein at spaced intervals along the lengths thereof, said primary spacer elements aligned in a first series of parallel rows and a second series of transversely oriented parallel rows spaced from said first series of parallel rows; a plurality of zirconium secondary spacer elements having transverse slots and protruding arches therein at spaced intervals along the lengths thereof, said secondary spacer elements aligned in a first series of parallel rows and a second series of parallel rows internested with and transversely oriented to said first series of parallel rows; said first series of secondary spacer element rows aligned in parallel to said first series of primary spacer element rows, and said second series of secondary spacer element rows aligned in parallel to said second series of primary spacer element rows; said slots of said first series of primary spacer element rows engaging said slots of said second series of secondary spacer element rows and at one side thereof extending one-third the depth thereof, said slots of said second series of primary spacer elements engaging slots of said first series of secondary spacer elements at the opposite side thereof and extending one-third the depth thereof; and a plurality of nickel, chromium, iron alloy spring ferrules, said spring ferrules comprised of substantially rectangular hollow bodies having openings in the sides thereof from which are projected spring members for biasing the fuel elements of said fuel assembly; one end of said spring ferrules engaging slots in said first series of primary spacer element rows, and said opposite end of said spring ferrules engaging slots in said second series of primary spacer element rows so as to be retained within the grid arrangement by said primary spacer elements, said spring ferrules being so located that said projected spring members bias said fuel elements against said protruding arches of said secondary spacer elements.

References Cited

UNITED STATES PATENTS

| | | | |
|---|---|---|---|
| 3,301,765 | 1/1967 | Eyre et al. | 176—78 |
| 3,166,481 | 1/1965 | Braun | 176—50 |
| 3,350,275 | 10/1967 | Venier et al. | 176—78 |
| 3,379,617 | 4/1968 | Andrews et al. | 176—78 |
| 3,380,890 | 4/1968 | Glandin et al. | 176—78 |
| 3,398,053 | 8/1968 | Huber et al. | 176—78 |
| 3,442,763 | 5/1969 | Ghetter et al. | 176—78 |

CARL D. QUARFORTH, Primary Examiner

G. G. SOLYST, Assistant Examiner

U.S. Cl. X.R.

176—76